United States Patent Office 3,298,965
Patented Jan. 17, 1967

3,298,965
METHOD FOR FORMING POLYOLEFIN CATALYST
Erik Tornqvist, Roselle, N.J., assignor to Esso Research and Engineering Company, a corporation of Delaware
No Drawing. Filed Mar. 23, 1966, Ser. No. 536,648
10 Claims. (Cl. 252—429)

This application is a continuation-in-part of Serial No. 87,781, filed February 8, 1961, in the name of Erik Tornqvist.

The present invention deals with a novel method for the formation of polymerization catalyst components suitable for use in polymerizing propylene and higher alpha olefins. More particularly, the invention relates to reacting a trihalide of a heavy transition metal with a halide of a Group II or III metal so as to form a co-crystalline material which can thereafter be activated with an organo-metallic compound and employed for the polymerization of propylene and higher olefins at moderate pressures.

There has been increasing interest in means for polymerizing propylene and higher alpha olefins. Many catalysts suitable for the polymerization of ethylene, such as $TiCl_3$, with or without activating compounds, have filed to successfully polymerize higher olefins to give solid polymers, particularly with respect to obtaining polymers of high crystallinity. Among the various catalyst systems for polymerizing olefins, a Ziegler-type catalyst, i.e., a reduced heavy transition metal halide activated with an organo-aluminum compound, has been of particular interest. However, the art is continuously searching for new catalyst systems suitable for the polymerization of propylene and higher alpha olefins. Systems employing commercially available materials are particularly desired.

In accordance with the present invention, means are taught for obtaining a catalyst showing high activity for the polymerization of $C_3$ and higher alpha olefins. In its broadest aspect, the present invention involves contacting trihalides of heavy transition metals, such as titanium trichloride, titanium tribromide, vanadium trichloride, etc., with a halide of a Group II or Group III metal, e.g., aluminum trichloride, aluminum tribromide, zinc dichloride, magnesium dichloride, gallium trichloride, etc., at a temperature above 200° C. e.g., 200° to 500° C., for a time sufficient to form a co-crystalline material suitable as a catalyst component. Preferably, the halogen constituent of the Group II–III metal halide and the transition metal halide are the same. The co-crystalline material can thereafter be activated with an organo-aluminum compound and employed for the polymerization of propylene and higher alpha olefins.

In a preferred embodiment, titanium trichloride is contacted with aluminum trichloride to form a co-crystalline material containing titanium chloride and aluminum trichloride; which material can thereafter be activated with an organo-aluminum compound. It is further preferred to homogenize the co-crystalline material prior to activation with an organo-aluminum compound by means of dry ball milling in an inert atmosphere for a suitable time, e.g., for 10 minutes to about 10 days, the most suitable time being dependent on the intensity of the milling. Other types of grinding, such as vibromilling, may also be successfully employed in this step provided the material can be properly protected from exposure to moisture, oxygen, and other catalyst poisons.

In another embodiment of the present invention, the transition metal trihalide is contacted with the Group II–III metal halide at temperatures of at least 200° C. in the presence of aluminum metal. In this embodiment, about 0.01 to 0.2 mole of aluminum are employed per mole of transition metal trihalide, e.g., titanium trichloride. The other reaction conditions used are the same as employed in the reaction of the transition metal compound with a Group II–III metal halide alone.

The transition metal compound and Group II–III metal halide may be contacted by various means. For example, finely-divided titanium trichloride may be sprayed into an atmosphere of aluminum chloride gas above about 200° C. Alternatively, solid aluminum chloride may be contacted with solid titanium trichloride. In general, the transition metal trihalide, e.g., titanium trihalide, is contacted with from 0.1 to 100 mole percent, preferably 5 to 50 mole percent, based on transition metal halide, of Group II–III metal halide, e.g., aluminum trichloride. Temperatures of 200° C. to 500° C., preferably 250° to 450° C., and pressures of 15 to 750 p.s.i.g., preferably 20 to 100 p.s.i.g., are employed during the reaction of titanium trichloride and aluminum chloride.

A particularly desirable catalyst component composition formed in accordance with the above methods by suitable adjustments of the proportions of materials employed is defined by the following formula:

$$TiCl_n \cdot xAlCl_3$$

wherein $n$ may vary from 2.7 to 3 and $x$ from 0.1 to 0.5. Especially preferred is the catalyst where $n$ is 2.8 to 3 and $x$ is 0.2.

The present means of forming a catalyst for the polymerization of $C_3$ and higher olefins offers several important advantages. Titanium trihalides, e.g., titanium trichloride, are readily available commercially. It is normally prepared by the reduction of titanium tetrachloride with hydrogen or titanium at a temperature of about 400° to 1000° C. Thus, one wishing to employ the present catalyst composition need not start with unreduced transition metal halides, such as titanium tetrachloride, and carry out a reduction at a very high temperature, nor encounter the highly exothermic reactions and great heat transfer problems characteristic of the reduction of a titanium tetrahalide. Another advantage is that the catalyst components prepared according to this invention will not normally contain significant amounts of hydrocarbon-soluble transition metal tetrahalides, such as $TiCl_4$, $TiBr_4$, $VCl_4$ etc. By contrast, preparations made by high temperature reduction of these halides usually contain some unreacted halide, which will usually have a detrimental effect on both catalyst activity and stereospecificity of the polymeric product secured. Although it is often possible to remove most of the unreacted soluble transition metal tetrahalide, such removal is generally cumbersome and usually involves through washing with a pure inert diluent followed by drying in vacuo. These steps are, of course, eliminated in the process according to this invention.

The present invention is clearly distinguished from various prior art procedures which bear a superficial resemblance to it. For example, Fischer (German Patent 874,215) indicates that aluminum chloride in combination with titanium tetrachloride (plus the optional presence of aluminum) serves as a catalyst for the polymerization of ethylene. However, the reaction of aluminum trichloride and titanium tetrachloride does not give a co-crystalline product, nor a catalyst component suitable for the polymerization of propylene and higher alpha olefins to highly crystalline polymers. Moreover, Fischer does not contemplate further reaction of the aluminum chloride-titanium tetrachloride product with an aluminum alkyl. Similarly, U.S. Patent 2,889,416 indicates that aluminum chloride and titanium dichloride serve as a catalyst for the polymerization of ethylene. Such a catalyst system is not suitable for the polymerization of propylene and higher olefins. Moreover, patentees do not contemplate the formation of a co-crystalline titanium chloride-aluminum chloride catalyst component, nor do they appreciate the necessity for further activation of the catalyst component.

The co-crystalline material formed by the reaction of titanium trichloride with aluminum chloride may be activated by any of the various organo-metallic compounds of a metal selected from Groups I to III of the Mendeleev Periodic Table. Organo-aluminum compounds, particularly aluminum alkyls, are preferred. Aluminum alkyl containing 2 to 20 carbon atoms, preferably 3 to 8 carbon atoms, are especially desirable. Various aluminum dialkyl monohalides and, in some cases, monoalkyl aluminum dihalides may also be used. In general, compounds having the structural formula $AlR_3$ and $AlR_2X$ may be employed wherein R is an alkyl group and X is a halogen atom, secondary amine radical, acid amide mercaptan radical, etc. Useful compounds include: aluminum triethyl, aluminum triisobutyl, aluminum diethyl monochloride, aluminum diethyl monobromide, aluminum ethyl propyl monochloride, aluminum tripropyl, aluminum trihexyl, and aluminum ethyl dichloride.

The thus activated catalyst is then used to polymerize $C_3$ and higher olefins under relatively low pressure conditions. Typically, polymerization is carried out at a temperature of 0° to 120° C., preferably 50° to 100° C. Pressures are preferably atmospheric, but may vary from subatomspheric to as much as 200 p.s.i.g. or more. In general, typical low pressure conditions are employed in the polymerization step. The present catalyst compositions are particularly suitable for polymerizing olefins characterized by the following structural formula:

$$RCH=CH_2$$

wherein R is a $C_1$ to $C_{20}$ alkyl, alicyclic or aryl group. Examples of suitable olefins which may be polymerized or copolymerized via the use of the present catalyst system are: propylene, butene-1, pentene-1, hexene-1, decene-1, dodecene-1, tetradecene-1, hexadecene-1, octadecene-1, vinylcyclohexene, and styrene. It should be recognized that the catalyst system of this invention may also be used for the polymerization of ethylene.

The various aspects and modifications of the present invention may be more clearly apparent by reference to the following description and accompanying examples.

Examples 1 through 3

Commerical anhydrous titanium trichloride (95+% pure $TiCl_3$, produced by the Stauffer Chemical Company) was mixed with (a) aluminum powder, or (b) aluminum chloride, or (c) both of these compounds in a series of three experiments. The relative quantities of titanium trichloride, aluminum powder and aluminum chloride employed are indicated in Table I along with the reaction conditions utilized. Each of the three charges of titanium trichloride and aluminum chloride and/or aluminum, in sealed Pyrex tubes was heated inside a nitrogen pressured (25 p.s.i.g.) rocking steel bomb to temperatures in excess of 200° C. to cause a reaction (in dry state) to take place with the consequent formation of a co-crystalline material, the composition of which is indicated in the table. After having been cooled, the tubes were removed and the dry purplish to brownish violet reaction products recovered inside a dry box. The yields were very close to quantitative. A 150 g. sample of each preparation was then steel ball milled for 6 days in a quart steel jar employing ⅜ inch diameter steel balls. The co-crystalline materials were then ready for testing as polymerization catalyst components.

TABLE I

| Example No. | I(a) | II(b) | III(c) |
|---|---|---|---|
| Starting Materials: | | | |
| $TiCl_3$, g. | 154.3 (1 mole) | 154.3 | 154.3 |
| $AlCl_3$, g. | | 26.7 (0.2 mole) | 17.8 (2/15 mole) |
| Al, g. | 1.8 (1/15 mole) | | 1.8 |
| Ti/Al Molar Ratio | 1/0.067 | 1/0.2 | 1/0.2 |
| Reaction Conditions: | | | |
| Temperature, °C. | 350 | 400 | 355 |
| Time, Hrs. | 16 | 16 | 16 |
| Composition of Product | $TiCl_{2.8} \cdot 0.067\ AlCl_3$ | $TiCl_3 \cdot 0.2\ AlCl_3$ | $TiCl_{2.8} \cdot 0.2\ AlCl_3$ |

(a) Reaction believed to be: $15\ TiCl_3 + Al \longrightarrow 15\ (TiCl_{2.8} \cdot 0.067\ AlCl_3)$.
(b) Reaction believed to be: $5\ TiCl_3 + AlCl_3 \longrightarrow 5\ (TiCl_3 \cdot 0.2\ AlCl_3)$.
(c) Reaction believed to be: $15\ TiCl_3 + 2\ AlCl_3 + Al \longrightarrow 15\ (TiCl_{2.8} \cdot 0.2\ AlCl_3)$.

The above experiments illustrate the reaction of titanium trichloride with aluminum chloride and/or aluminum to form titanium chloride co-crystallized with aluminum chloride. Examples 2 and 3 further illustrate the formation of a co-crystalline material represented by the formula:

$$TiCl_n \cdot 0.2\ AlCl_3$$

wherein $n$ varies from 2.8 to 3.

Examples 4 through 7

The catalyst components of Examples 1–3, together with commercial titanium trichloride (unmodified but ball milled), were then activated with aluminum triethyl and used to polymerize propylene under atmospheric pressure conditions. The relative amounts of the various components is indicated in Table II. The polymerizations were carried out for 1 hour at 75° C. with one liter of xylene being used as the diluent. Sufficient propylene was added so that at least 10% was unabsorbed and withdrawn as effluent, thus insuring constant and maximum monomer concentration throughout the polymerization.

The results secured by catalysts prepared in accordance with the present invention (Examples 6 and 7) as compared with the use of commercial titanium trichloride, and titanium trichloride reacted only with aluminum are indicated in Table II.

TABLE II

| Example No. | IV | V | VI | VII |
|---|---|---|---|---|
| Catalyst, Titanium Chloride Component: | | | | |
| Preparation (Example No.) (a) | Commercial | I | II | III |
| Composition | $TiCl_3$ | $TiCl_{2.8} \cdot 0.067\ AlCl_3$ | $TiCl_3 \cdot 0.2\ AlCl_3$ | $TiCl_{2.8} \cdot 0.2\ AlCl_3$ |
| Weight, g | 0.386 | 0.390 | 0.453 | 0.435 |
| $AlEt_3$, g | 0.57 | 0.552 | 0.513 | 0.513 |
| Al/Ti Ratio (b) | 2 | 2 | 2 | 2 |
| Results: | | | | |
| Yield, g | 40.1 | 42.0 | 59.0 | 61.9 |
| Waxy Polymer, percent | 2.5 | 3.1 | 2.0 | 2.6 |
| Catalyst Efficiency, g./g. (d) | 42.0 | 44.6 | 61.1 | 65.3 |
| Properties of Solid Polymer, Molecular Weight $\times 10^{-3}$ (c). | 200 | 195 | 205 | 230 |

(a) All preparations were steel ball milled dry for 6 days before being tested.
(b) Includes Al in $TiCl_n \cdot xAlCl_3$ preparations.
(c) According to the Harris correlation, "J. Polym. Sci.," 8, 360 (1952).
(d) Defined as grams of total polymer per gram of total catalyst.

As shown in the table, catalysts prepared in accordance with the present invention (Examples 6 and 7) when used to polymerize propylene gave improved yields and catalyst efficiencies while forming highly crystalline polypropylene.

Numerous modifications may be made to the present invention. Titanium trichloride and aluminum chloride may be reacted in various proportions to give various co-crystalline products. However, co-crystalline products which contain about 0.1 to 0.5 mole of aluminum chloride per mole of titanium trichloride are particularly useful. It is desirable to employ as a starting material a titanium halide containing 95 to 100% pure titanium trihalide, especially 99+% pure $TiCl_3$.

The titanium chloride may advantageously be reduced to a titanium valence below 3, preferably between about 2.7 and 3. As shown, this reduction can be easily carried out simultaneously with the incorporation of $AlCl_3$ by adding a calculated amount of aluminum powder. Such additional reduction will also take care of the free $TiCl_4$ which may be present in commercial $TiCl_3$ preparations. Thus the purity requirement for $TiCl_3$ used for catalyst preparation according to the latter method of this invention is lower than for $TiCl_3$ which is to be used directly in stereospecific polymerizations. Actually, $TiCl_4$ contaminations as high as 10% can be taken care of by adding a sufficient amount of aluminum to the $TiCl_3$-$AlCl_3$ charge before the preparation of the catalyst component. However, as noted previously, 95+% pure $TiCl_3$ is preferred for best results.

Having described the present invention, that which is sought to be protected is set forth in the following claims.

What is claimed is:

1. A method for preparing an improved catalyst component useful in the polymerization of olefins which comprises contacting a trihalide of a transition metal with a halide of a member of the group consisting of Group II and Group III metals at a temperature above 200° C. for a time sufficient to form a co-crystalline material.

2. The process of claim 1 wherein said transition metal halide is a titanium trihalide and wherein said halide of a member of the group consisting of Group II and Group III halides is an aluminum trihalide.

3. The process of claim 2 wherein the halogen constituents of the Group II–III metal halide and the transition metal halide are the same.

4. The process of claim 3 wherein said titanium trihalide is contacted with 0.1 to 100 mole percent, based on titanium trihalide, of aluminum trihalide at a temperature of from 200 to 500° C. to form a co-crystalline material.

5. The process of claim 4 wherein said titanium trihalide is titanium trichloride and said aluminum trihalide is aluminum trichloride.

6. The process of claim 4 wherein said catalyst component is thereafter activated with an organo-aluminum compound.

7. The process of claim 6 wherein said co-crystalline material is dry ball milled prior to admixing with said organo-aluminum compound.

8. The process of claim 6 wherein said organo-aluminum compound is triethyl aluminum.

9. The process of claim 5 wherein said titanium trichloride and aluminum trichloride are contacted in the presence of from 0.01 to 0.2 mole of aluminum per mole of titanium trichloride.

10. The process of claim 9 wherein the co-crystalline material formed is represented by the formula:

$$TiCl_n \cdot xAlCl_3$$

wherein $n$ ranges from 2.7 to 3.0 and $x$ from 0.1 to 0.5.

References Cited by the Examiner

UNITED STATES PATENTS

| 2,970,133 | 1/1961 | Sistrunk | 252—442 |
| 3,032,510 | 5/1962 | Tornqvist et al. | 252—429 |
| 3,046,264 | 7/1962 | Tornqvist et al. | 260—94.945 |
| 3,130,303 | 4/1964 | Tornqvist et al. | 252—429 |

TOBIAS E. LEVOW, *Primary Examiner.*

J. G. LEVITT, *Assistant Examiner.*